(12) United States Patent
Lin et al.

(10) Patent No.: US 6,784,985 B2
(45) Date of Patent: Aug. 31, 2004

(54) THREE-DIMENSIONAL LASER BEAM DETECTION DEVICE

(75) Inventors: Tung-Lung Lin, Banchiau (TW); Hsing-Hua Liu, Pingjen (TW); Chun-Nan Lin, Shijr (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/339,033

(22) Filed: Jan. 8, 2003

(65) Prior Publication Data
US 2003/0128356 A1 Jul. 10, 2003

(30) Foreign Application Priority Data
Jan. 9, 2002 (TW) ...................................... 91200084 U (51) Int. Cl.$^7$ ................................................. G01C 1/00
(52) U.S. Cl. ....................................... 356/138; 250/215
(58) Field of Search .......................... 356/138; 250/215, 250/559.29, 559.3; 369/44.35, 44.25

(56) References Cited

U.S. PATENT DOCUMENTS

| | | | | |
|---|---|---|---|---|
| 5,251,194 A | * | 10/1993 | Yoshimoto et al. | 369/44.26 |
| 5,347,501 A | * | 9/1994 | Iimura | 369/44.25 |
| 5,347,503 A | * | 9/1994 | Koyama et al. | 369/44.32 |
| 5,425,013 A | * | 6/1995 | Fennema et al. | 369/44.35 |

* cited by examiner

Primary Examiner—Michael P. Statura
Assistant Examiner—Juan D Valentin (57) ABSTRACT

A three-dimensional laser beam detection device. The three-dimensional laser beam detection device has a portion fixed to a laser source such as an optical head, an adjusting device provided on the fixed portion, and a laser beam detection portion coupled to the adjusting device. The adjusting device has a first table movably coupled to the fixed portion in a first direction, and a first adjusting portion coupled to the first table for moving the first table relatively to the fixed portion in the first direction. The first adjusting portion is formed within the adjusting device. The laser beam detection portion has a detector to detect the laser beam radiating from the laser source. The fixed portion has a fixed relative position to the laser source, and the detector is adjustable in relation to the laser source by performing adjustment with the adjusting device.

8 Claims, 9 Drawing Sheets

THREE-DIMENSIONAL LASER BEAM DETECTION DEVICE

BACKGROUND OF THE INVENTION

1. Field of the Invention

The present invention relates to a three-dimensional laser beam detection device, and particularly to a three-dimensional laser beam detection device with a three-dimensional stage, wherein adjusting portions are formed.

2. Description of the Related Art

In recent years, optical disks have been commonly used as storage media. There are various types of optical disks, such as CDs (compact disks), DVD, and others, and their corresponding optical drives. However, in any type of optical drive, an optical head serves as a key factor in correctly reading data from, or writing data to, the disk.

Figure 1:
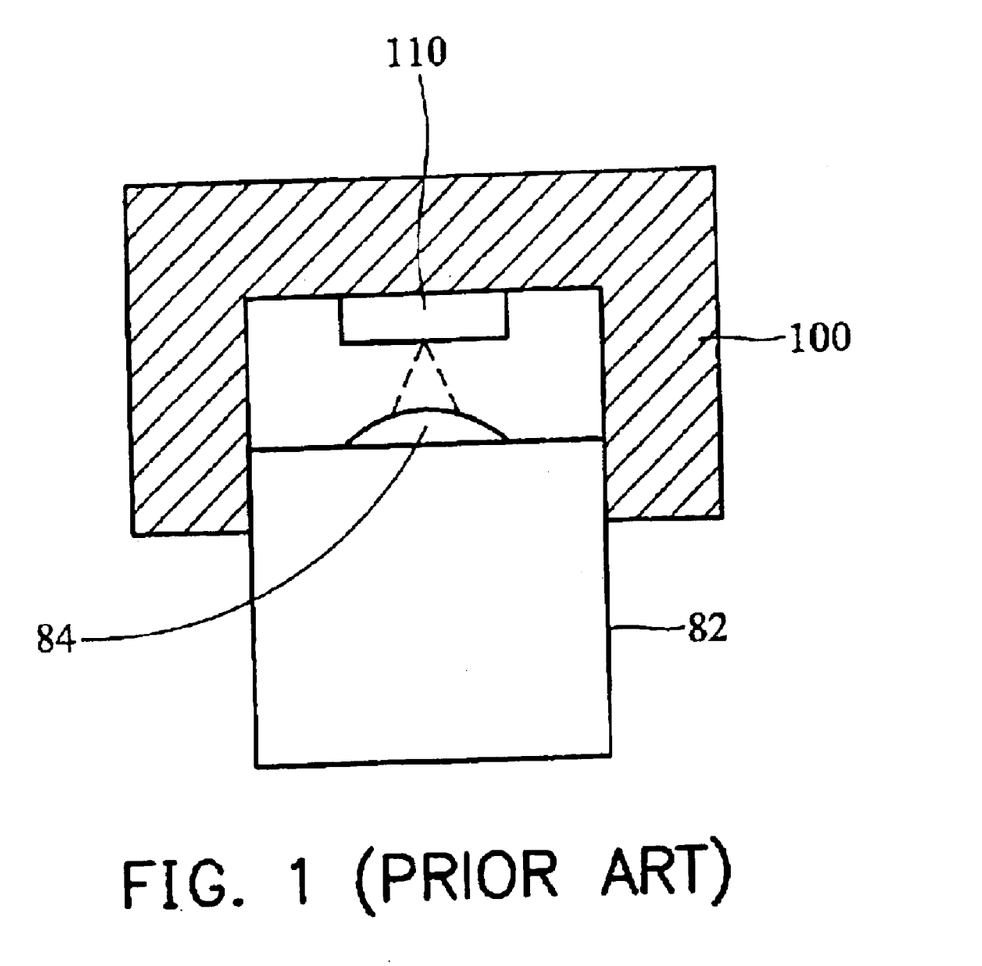
FIG. 1 is a schematic view of a conventional laser beam detector.

In the manufacturing process of an optical drive, it is required to perform power calibration for quality control of the optical head. Presently, the power calibration process is performed as shown in FIG. 1, in which a laser beam detector 100 is disposed on the optical head 82. The conventional laser beam detector 100 has a diode 110 to detect a laser beam radiating from an object lens 84 of the optical head 82.

However, the conventional laser beam detector 100 in FIG. 1 is fixed to the optical head 82. Thus, a diode 110 with a large size (a surface area of 1 $cm^2$ in usual) is required in the conventional laser beam detector 100 to detect possible position deviation of the object lens 84. Thus, the typical diode used in the optical head, which has a relatively smaller size, is not suitable for the conventional laser beam detector. It goes without saying that, due to the large size of the diode, cost and manufacturing difficulty of the conventional laser beam detector are increased, and the manufacturer of the laser beam detector has to reduce the quality requirement of the diode in order to achieve mass production.

In order to reduce the cost and manufacturing difficulty of the conventional laser beam detector, it is preferable to obtain a three-dimensionally adjustable laser beam detection device, in which the typical small-sized diode used in the optical head can be applied.

Figure 2A:
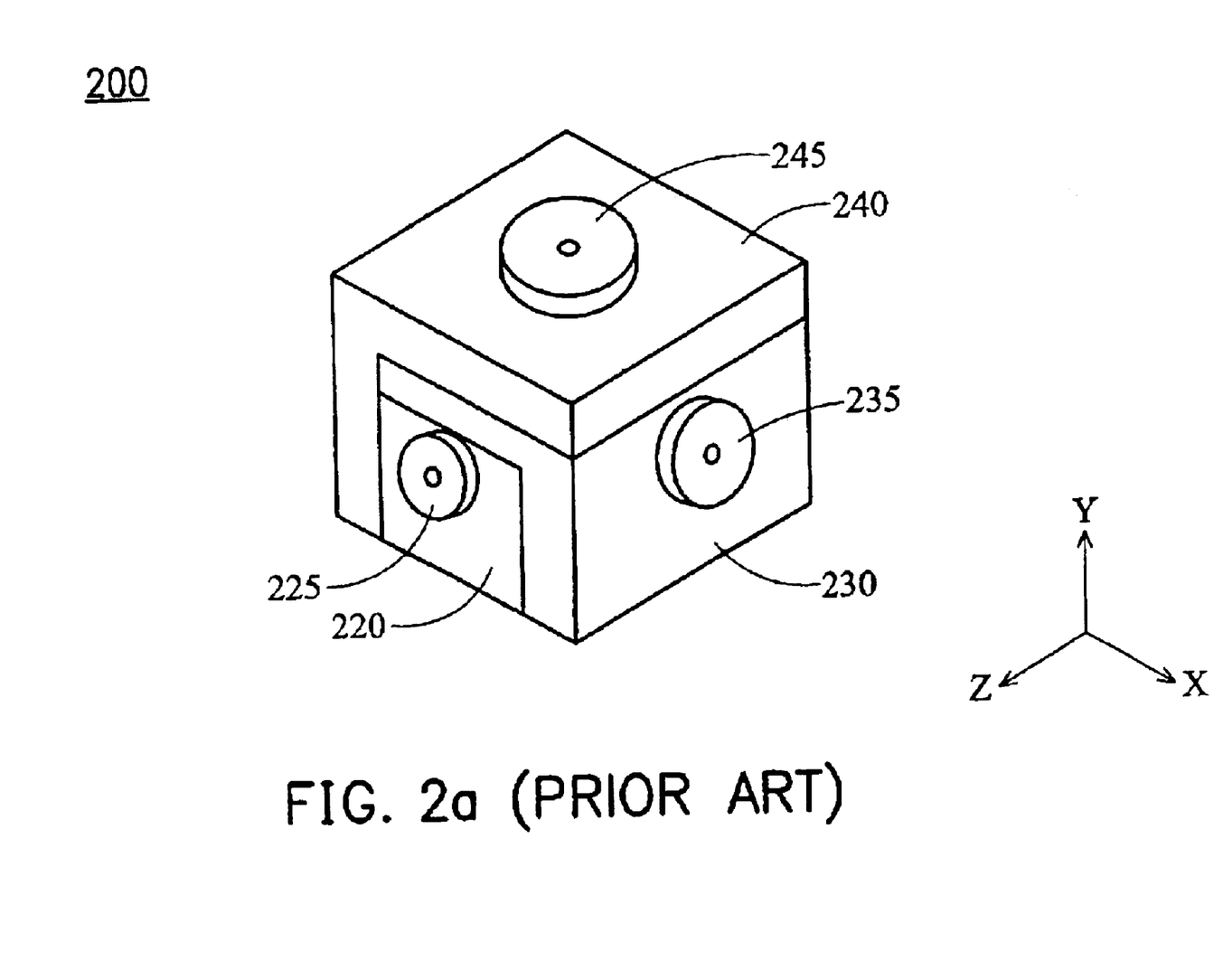
FIG. 2a and FIG. 2b are schematic views of an example of a conventional three-dimensional stage.
Figure 2B:
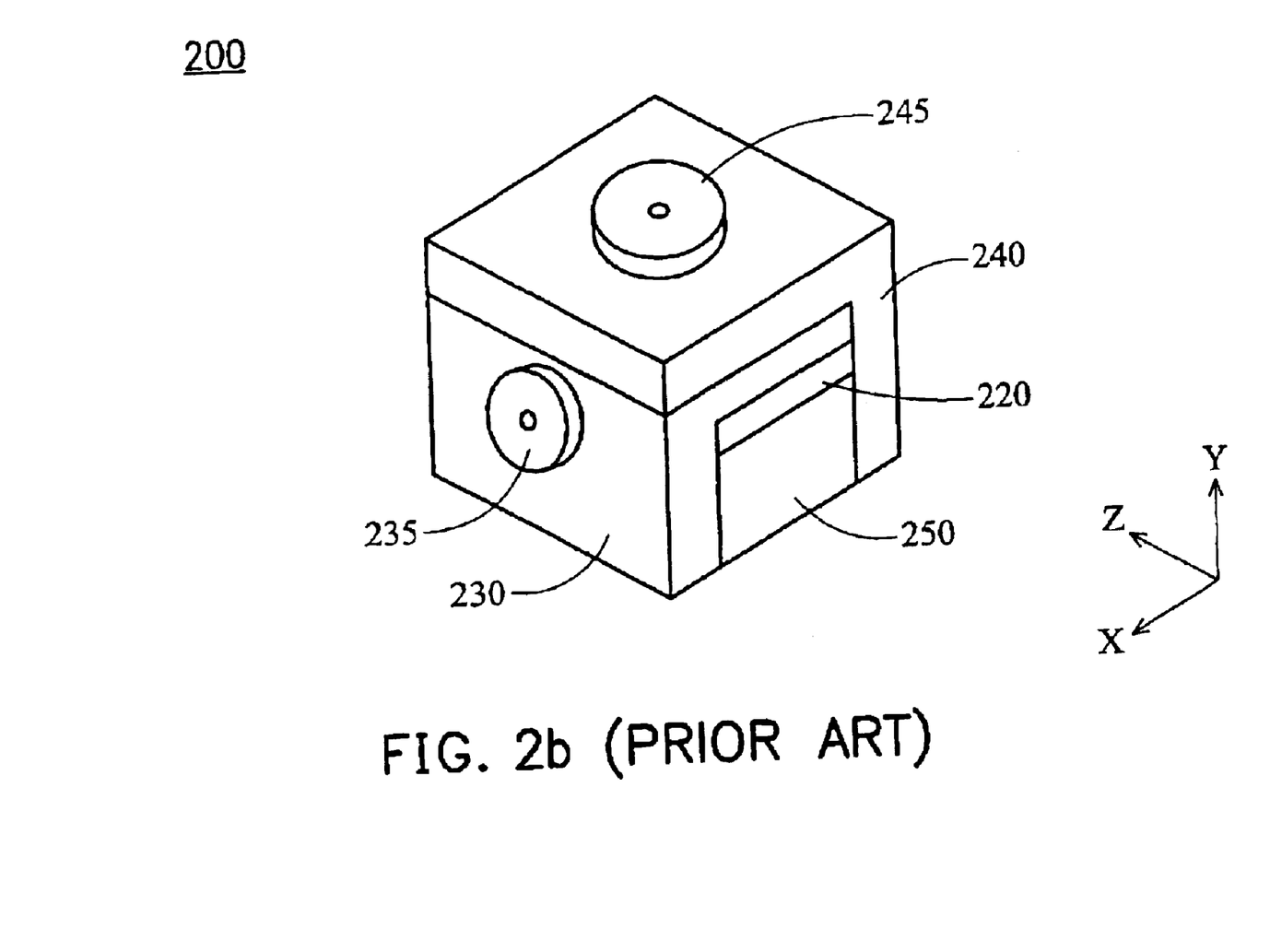

Conventionally, a three-dimensional stage 200 as shown in FIG. 2a and FIG. 2b is applied to perform three-dimensionally adjustable movement. The conventional three-dimensional stage 200 has a fixed portion 250, and an X-table 230, a Y-table 240, and a Z-table 220 respectively movable in the three-dimensionally orthogonal directions X, Y and Z. In FIG. 2a, the Z-table 220 is coupled to the fixed portion 250 and can be adjusted to move along direction Z with a screw-type Z-adjusting portion 225; the X-table 230 is coupled to the Z table 220 and can be adjusted to move along direction X with a screw-type X-adjusting portion 235; and the Y-table 240 is coupled to the X table 230 and can be adjusted to move along direction Y with a screw-type Y-adjusting portion 245. With the above-mentioned construction, the Y table 240 of the three dimensional stage 200 can be three-dimensionally adjustable in relation to the fixed portion 250.

Figure 3:
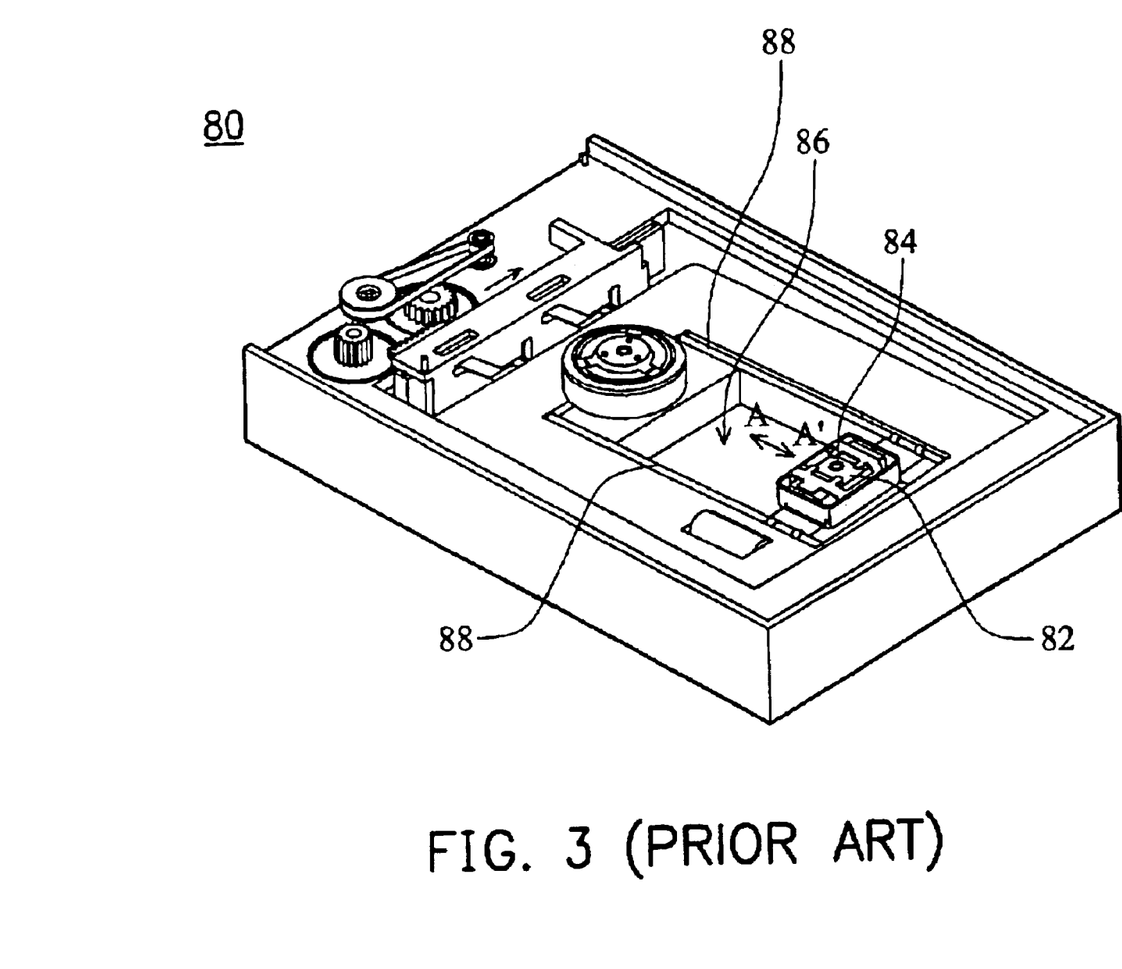
FIG. 3 is a schematic view of an optical head in a conventional optical drive.

However, the above-mentioned three-dimensional stage 200 has its drawbacks. Referring to FIG. 3, the optical head 82 of the optical drive 80 is positioned within a sliding cavity 86, in which two guiding tracks 88 support the optical head 82 to move along the cavity 86. Meanwhile, the X-adjusting portion 235, the Y-adjusting portion 245 and the Z-adjusting portion 225 of the conventional three-dimensional stage 200 are all positioned outwardly on the surface of the three-dimensional stage 200. As a result, if the above-mentioned three-dimensional stage 200 is applied to obtain a three-dimensionally adjustable laser beam detector for performing power calibration of the optical head 82, the laser beam detector has a relatively large size at the portion of the three-dimensional stage 200, and interference may occur between the adjusting portions of the three-dimensional stage 200 and the surrounding mechanism of the optical drive 80.

SUMMARY OF THE INVENTION

In view of this, the present invention discloses a three-dimensional laser beam detection device, in which the laser beam detector can be three-dimensionally adjustable, so that the typical small-sized diode used in the optical head can be applied, and the cost and manufacturing difficulty of the laser beam detection device can be reduced.

Meanwhile, the present invention discloses a three-dimensional stage, in which adjusting portions are formed within the three-dimensional stage, so that the size of the three-dimensional stage can be reduced, and interference between the adjusting portions and the surrounding mechanism can be prevented.

The present invention discloses a three-dimensional laser beam detection device for adjustably detecting a laser beam radiating from a laser source sliding within a sliding cavity. The three-dimensional laser beam detection device has a fixed portion fixed to the laser source; an adjusting device provided on the fixed portion; and a laser beam detection portion coupled to the adjusting device, in which the laser beam detection portion has a detector to detect the laser beam radiating from the laser source. In the three-dimensional laser beam detection device, the fixed portion has a fixed relative position to the laser source, and the detector is adjustable in relation to the laser source by the adjusting device.

In the three-dimensional laser beam detection device, the adjusting device preferably has a three-dimensional adjusting portion with a first table, a second table, and a third table, in which the first table is movably coupled to the fixed portion in a first direction; the second table is movably coupled to the first table in a second direction substantially perpendicular to the first direction; and the third table is movably coupled to the second table in a third direction substantially perpendicular to the first direction and the second direction. Further, the adjusting device preferably has a first adjusting portion, a second adjusting portion and a third adjusting portion respectively coupled to the first, second and third tables for three-dimensionally moving each of the first, second and third tables relatively.

Further, it is preferable to use a diode as the detector, and the laser source can be an optical head.

The present invention also discloses a stage. The stage has a fixed portion and an adjusting device having a first table and a first adjusting portion, in which the first table is movably coupled to the fixed portion in a first direction, and the first adjusting portion is coupled to the first table for moving the first table relatively to the fixed portion in the first direction. The stage of the present invention is characterized at the first adjusting portion being formed within the adjusting device.

In the stage of the present invention, the adjusting device preferably has a second table and a second adjusting portion, in which the second table is movably coupled to the first table in a second direction substantially perpendicular to the first direction, and the second adjusting portion is coupled to the second table for moving the second table relatively to the first table in the second direction. Further, the adjusting device preferably has a third table and a third adjusting portion, in which the third table is movably coupled to the second table in a third direction substantially perpendicular to the first direction and the second direction, and the third adjusting portion is coupled to the third table for moving the third table relatively to the second table in the third direction.

Further, the first, second and third adjusting portions can be relatively a first spring, a second spring and a third spring. Further, a combination of at least a sliding block and at least a corresponding groove can be applied between the fixed portion and the first table, the first table and the second table, or the second table and the third table in order to perform relative movement.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

An embodiment of the three-dimensional laser beam detection device 1 of the present invention is described hereinafter in detail with reference to FIG. 4a, FIG. 4b, FIG. 4c and FIG. 4d.

Figure 4A:
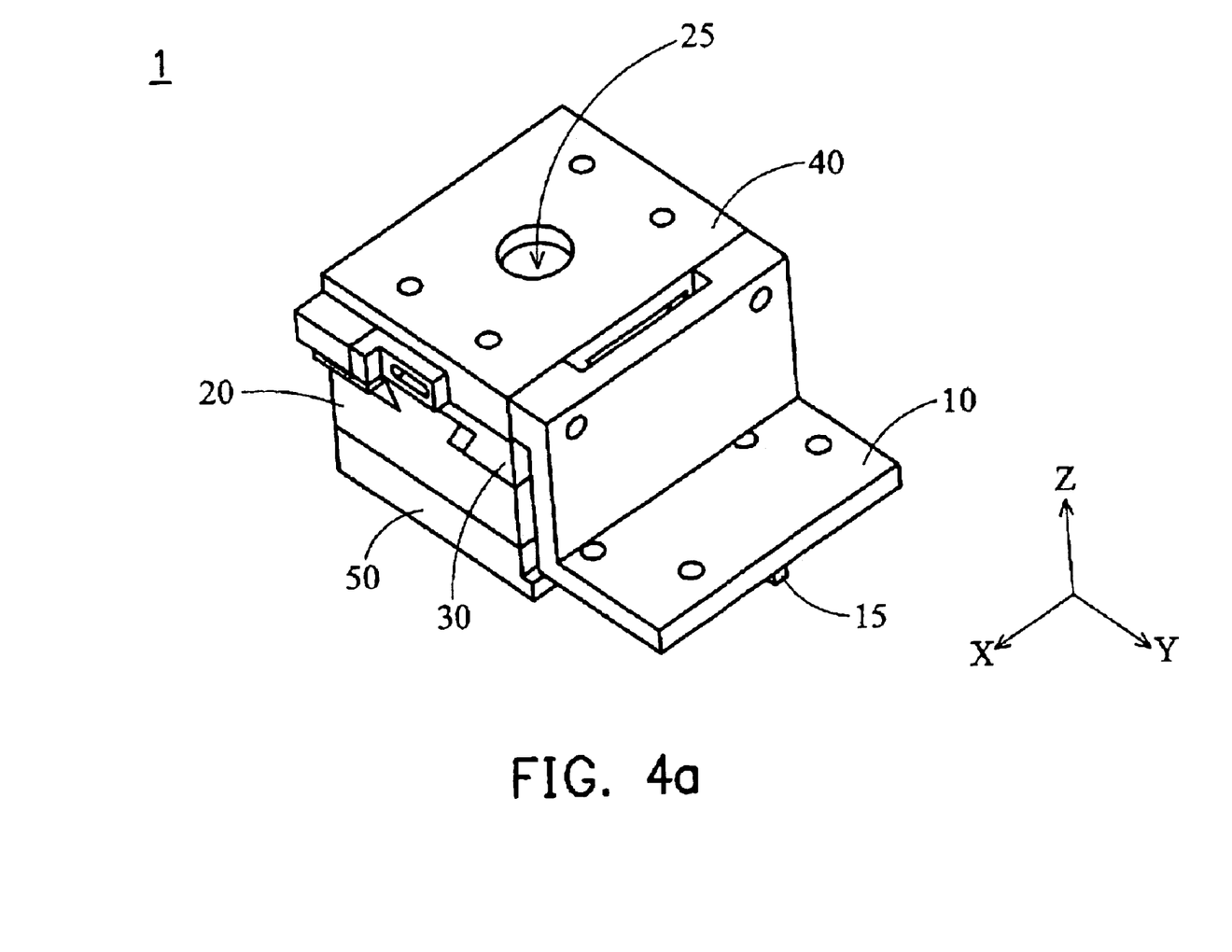
FIG. 4a and FIG. 4b are perspective views of an embodiment of the three-dimensional laser beam detection device of the present invention.
Figure 4B:
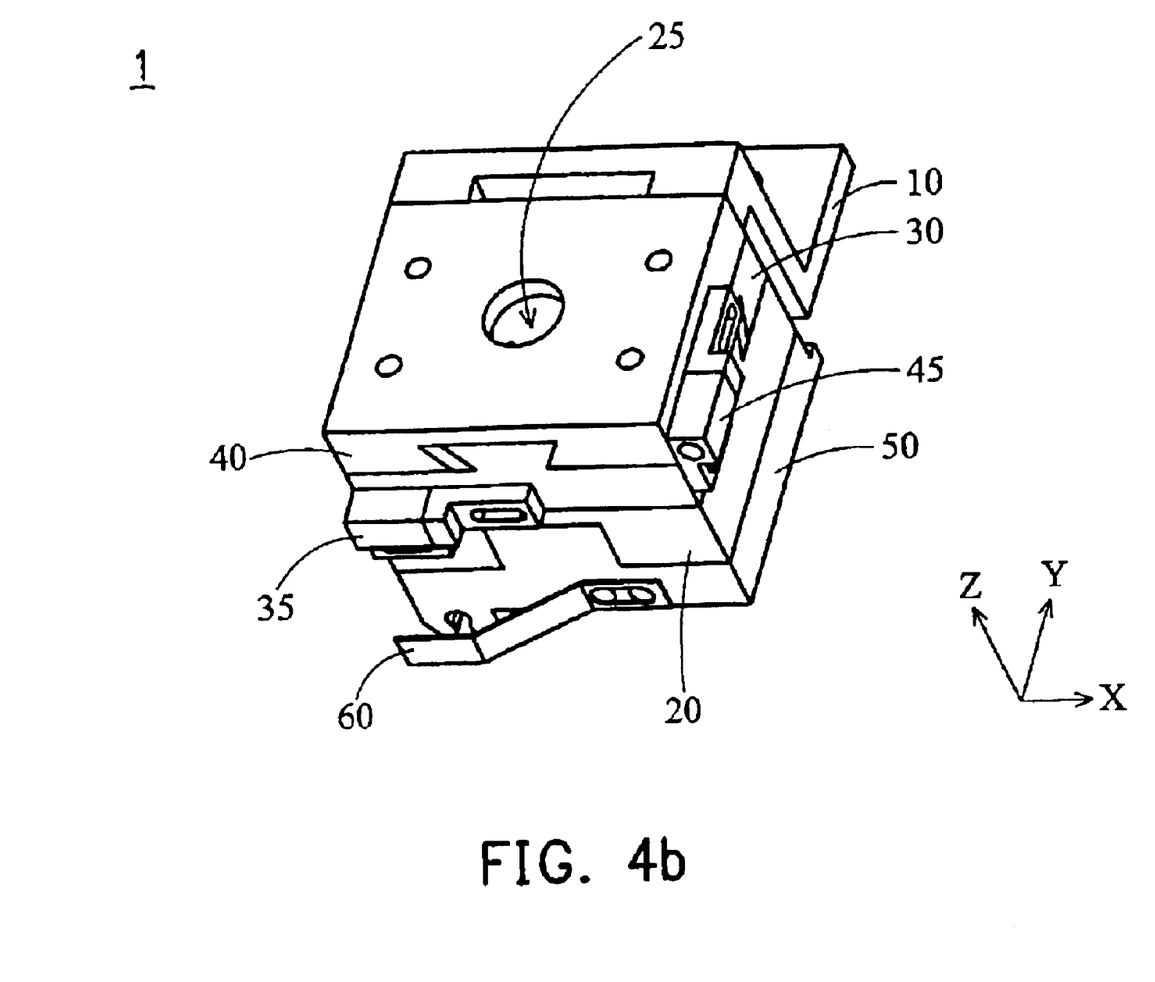
Figure 4C:
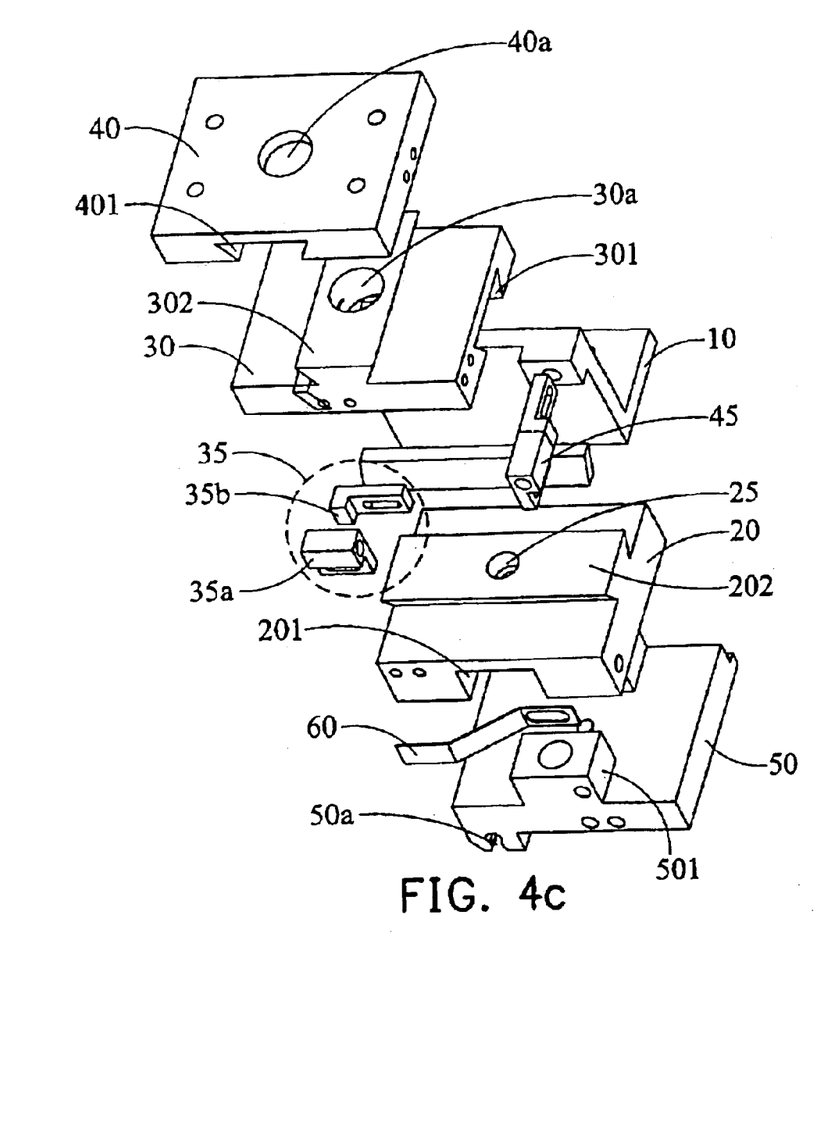
FIG. 4c is a dissembled view of the above-mentioned embodiment in FIG. 4a and FIG. 4b.
Figure 4D:
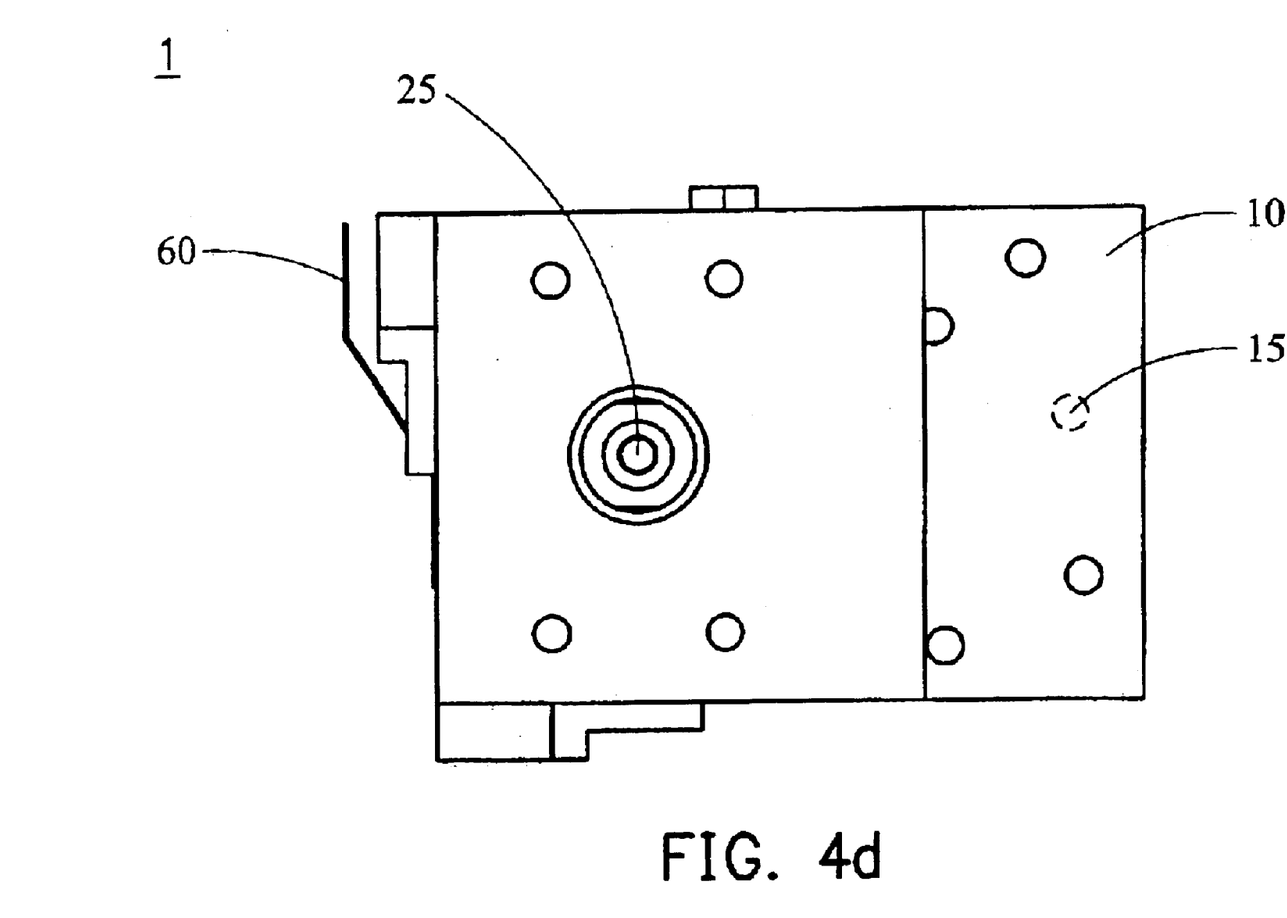
FIG. 4d is a top view of the above-mentioned embodiment in FIG. 4a and FIG. 4b.

As shown in FIGS. 4a to 4c, the three-dimensional laser beam detection device 1 of the embodiment has a stage and a laser beam detection portion 10. The stage of the embodiment has a fixed portion 50 and an adjusting device. The adjusting device is provided on the fixed portion 50 and has a Z-table (that is, a first table) 20, an X-table (a second table) 30, and a Y-table (a third table) 40. An X-adjusting portion (a second adjusting portion) 35 and a Y-adjusting portion (a third adjusting portion) 45 are provided outwardly from the adjusting device, and a Z-adjusting portion (a first adjusting portion) 25 is formed within the adjusting device. Further, a track fixing portion 50a is provided on the bottom of the fixed portion 50, and a spring leaf 60 is provided on a side of the fixed portion 50. Detailed construction of the above-mentioned members can be shown clearly in the dissembled view of FIG. 4c.

In the embodiment, the Z-table 20 is coupled to the fixed portion 50 such that a first groove 201 of the Z-table 20 corresponds to a first sliding block 501 of the fixed portion 50, so that the Z-table 20 can move on direction Z (the first direction) in relation to the fixed portion 50. The Z-adjusting portion 25 is coupled to the Z-table 20 for moving the Z-table 20 relatively to the fixed portion 50 in direction Z. It should be noted that the Z-adjusting portion 25 is formed within the adjusting device, so that no interference occurs between the Z-adjusting portion 25 and the surrounding mechanism.

Further, the X-table 30 is coupled to the Z-table 20 such that a second groove 301 of the X-table 30 corresponds to a second sliding block 202 of the Z-table 20, so that the X-table 30 can move on direction X (the second direction) in relation to the Z-table 20. The X-adjusting portion 35 has a screw portion 35a coupled to a side of the Z-table 20 and an urging portion 35b coupled to a side of the X-table 30, in which the screw portion 35a and the urging portion 35b are connected with a spring (not shown). The screw portion 35a has a screw hole, and an adjusting screw bolt (not shown), which urges against the urging portion 35b, is provided within the screw hole, so that the X-table 30 can be moved relatively to the Z-table 20 in direction X by adjustment of the adjusting screw bolt.

Similarly, the Y-table 40 is coupled to the X-table 30 such that a third groove 401 of the Y-table 40 corresponds to a third sliding block 302 of the X-table 30, so that the Y-table 40 can move on direction Y (the third direction) in relation to the X-table 30. The Y-adjusting portion 45, which has a similar construction to that of the X-adjusting portion 35 and hence is not hereinafter described in detail, is coupled to the Y-table 40 for moving the Y-table 40 relatively to the X-table 30 in direction Y. Further, through holes 30a and 40a are respectively provided on the X-table 30 and Y-table 40 for access to the Z-adjusting portion 25.

It should be noted that, although the above-mentioned embodiment describes the three-dimensional space in an orthogonal coordinate system of (X, Y, Z), the three tables of the stage could be provided in any sequential construction. That is, the tables of the stage are not limited in the above-mentioned Z-X-Y sequence.

Further, in the embodiment, the X-adjusting portion 35 and the Y-adjusting portion 45 are provided outwardly from the adjusting device. However, it is preferable that the X-adjusting portion 35 and the Y-adjusting portion 45 be moved within the adjusting device in a way similar to the Z-adjusting portion 25 in the embodiment, so that the size of the stage can be further reduced, and chance of interference can be minimized. It goes without saying that any preferable adjusting mechanism can be applied to the X-adjusting portion 35 and the Y-adjusting portion 45.

Further, in the embodiment, the three tables are coupled to each other such that a groove corresponds to a sliding block. However, the present invention allows any pair of the sliding blocks and the grooves to be interchanged or reduplicated.

Figure 5:
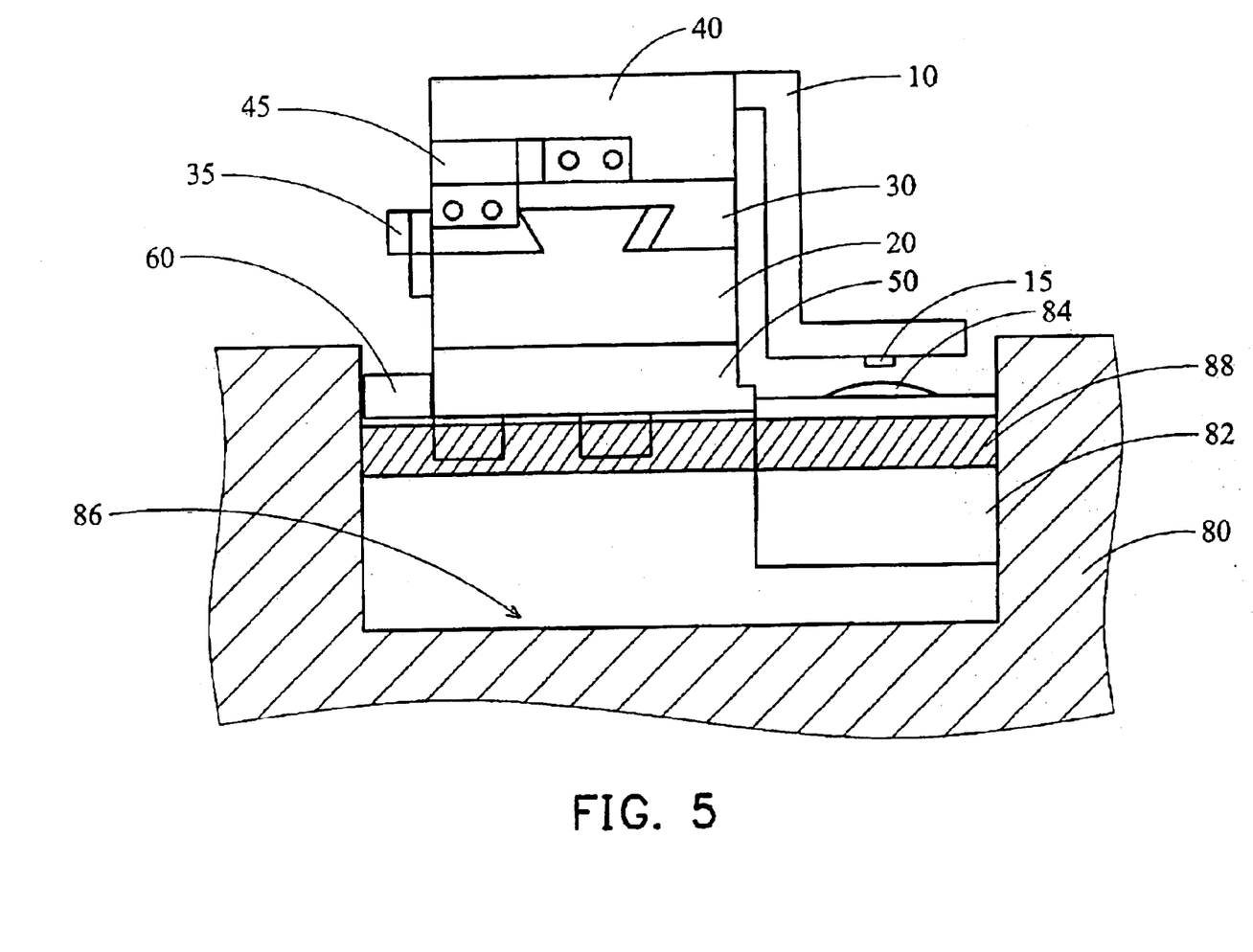
FIG. 5 is a schematic view of the above-mentioned embodiment, in which the three-dimensional laser beam detection device is detecting the optical head.

The laser beam detection portion 10 of the embodiment along with power calibration of the three-dimensional laser beam detection device 1 of the present invention are described hereinafter in detail with reference to FIG. 5.

In the embodiment, the laser beam detection portion 10 is coupled to the Y-table 40 of the adjusting device, and a detector, such as a diode 15, is provided on the laser beam detection portion 10 to detect the laser beam radiating from a laser source, such as the optical head 82 of the optical drive 80. When the three-dimensional laser beam detection device 1 performs power calibration, the optical head 82 is positioned to one side of the sliding cavity 86 of the optical drive 80, and the three-dimensional laser beam detection device 1 is disposed so that the track fixing portion 50a on the bottom of the fixed portion 50 is engaged to the guiding tracks 88 of the sliding cavity 86. Thus, the other side of the sliding cavity 86 presses the spring leaf 60, and the three-dimensional laser beam detection device 1 is fixed between the two sides of the sliding cavity and above the optical head 82. In this case, the fixed portion 50 is fixed to the optical head 82, and the power calibration can be performed simply by three-dimensionally moving the laser beam detection portion 10 with adjustment of the adjusting device.

It should be noted that, although the fixed portion 50 and the optical head 82 must be fixed in order to perform the power calibration, the above-mentioned fixing method between the fixed portion 50 and the optical head 82 does not limit the present invention. That is, the fixed portion 50 and the optical head 82 can be fixed with any fixture or mechanism different from the above-mentioned fixing construction.

The present invention provides a three-dimensional laser beam detection device, in which the laser beam detection portion can be three-dimensionally adjusted, so that the typical small-sized diode used in the optical head can be applied instead of the conventional large-sized diode, which leads to reduced cost and manufacturing difficulty. Further, the present invention provides a stage in which the adjusting portion is formed within the adjusting device, so that the stage has a reduced size, and interference between the adjusting portions and the surrounding mechanism can be prevented, which is definitely an advantage in application of power calibration with the three-dimensional laser beam detection device.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Thus, the scope of the appended claims should be accorded the broadest interpretation so as to encompass all such modifications and similar arrangements.

What is claimed is:

1. A three-dimensional laser beam detection device for adjustably detecting a laser beam radiating from a laser source sliding within a sliding cavity, the three-dimensional laser beam detection device comprising:

a fixed portion fixed to the laser source;

an adjusting device provided on the fixed portion; and a laser beam detection portion coupled to the adjusting device, the laser beam detection portion having a detector to detect the laser beam radiating from the laser source;

wherein the fixed portion has a fixed relative position to the laser source, and the detector is adjustable in relation to the laser source by performing adjustment with the adjusting device.

2. The three-dimensional laser beam detection device according to claim 1, wherein the adjusting device comprises a three-dimensional adjusting portion, the three-dimensional adjusting portion having a first table, a second table, and a third table, wherein:

the first table is movably coupled to the fixed portion in a first direction;

the second table is movably coupled to the first table in a second direction substantially perpendicular to the first direction; and the third table is movably coupled to the second table in a third direction substantially perpendicular to the first direction and the second direction.

3. The three-dimensional laser beam detection device according to claim 2, wherein the adjusting device further comprises:

a first adjusting portion coupled to the first table for moving the first table relatively to the fixed portion in the first direction;

a second adjusting portion coupled to the second table for moving the second table relatively to the first table in the second direction; and a third adjusting portion coupled to the third table for moving the third table relatively to the second table in the third direction.

4. The three-dimensional laser beam detection device according to claim 3, wherein a guiding track is provided within the sliding cavity, and the laser source is movably provided on the guiding track.

5. The three-dimensional laser beam detection device according to claim 4, wherein a track fixing portion is provided on the fixed portion to be engaged on the guiding track.

6. The three-dimensional laser beam detection device according to claim 3, wherein at least one of the first, second and third adjust portions is formed within the adjusting device.

7. The three-dimensional laser beam detection device according to claim 1, wherein the fixed portion has a spring leaf to urge against a side of the sliding cavity to fix the fixed portion and the laser source.

8. The three-dimensional laser beam detection device according to claim 1, wherein the laser source is an optical head.

* * * * *